Feb. 25, 1930.  H. A. SOULIS ET AL  1,748,524
INTERNAL COMBUSTION ENGINE PISTON
Filed May 23, 1927    3 Sheets-Sheet 3
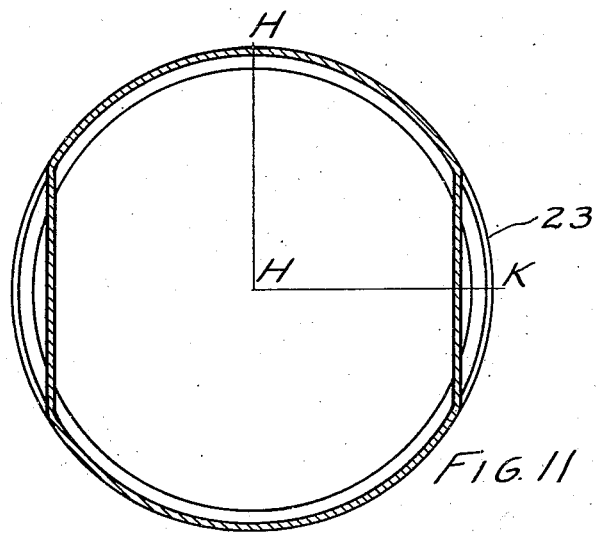
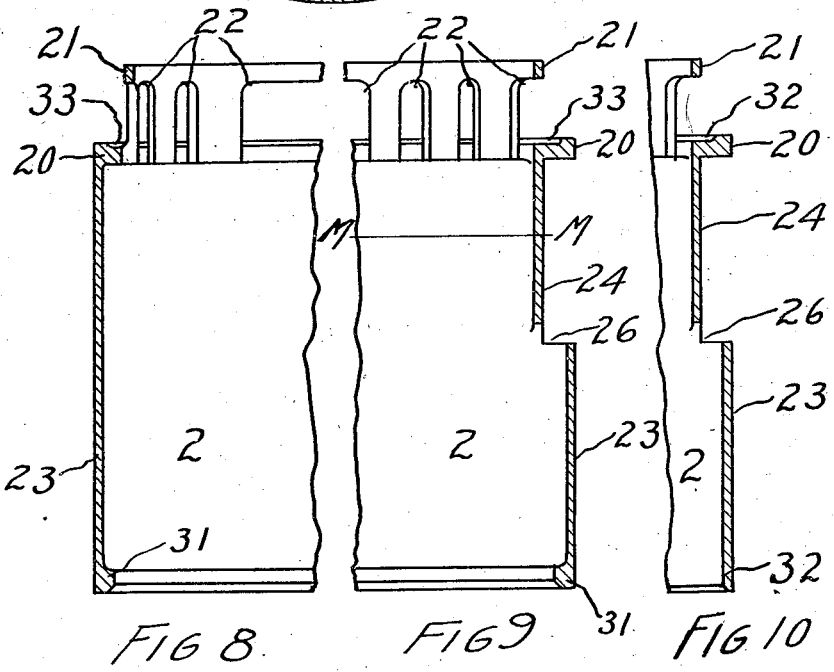
INVENTORS
Harold A. Soulis.
Wilbur T. Soulis Patented Feb. 25, 1930

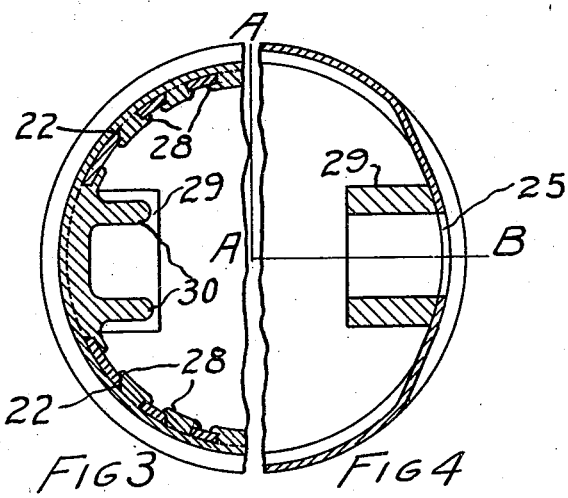
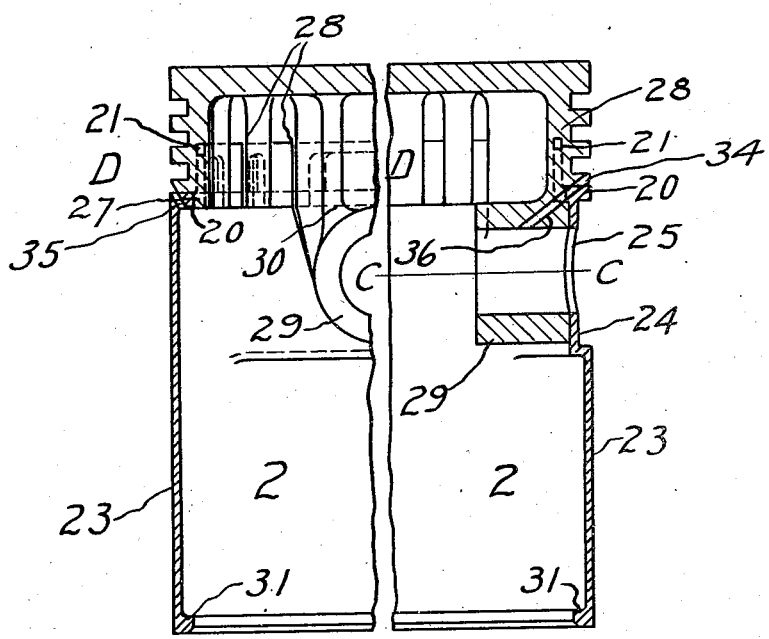

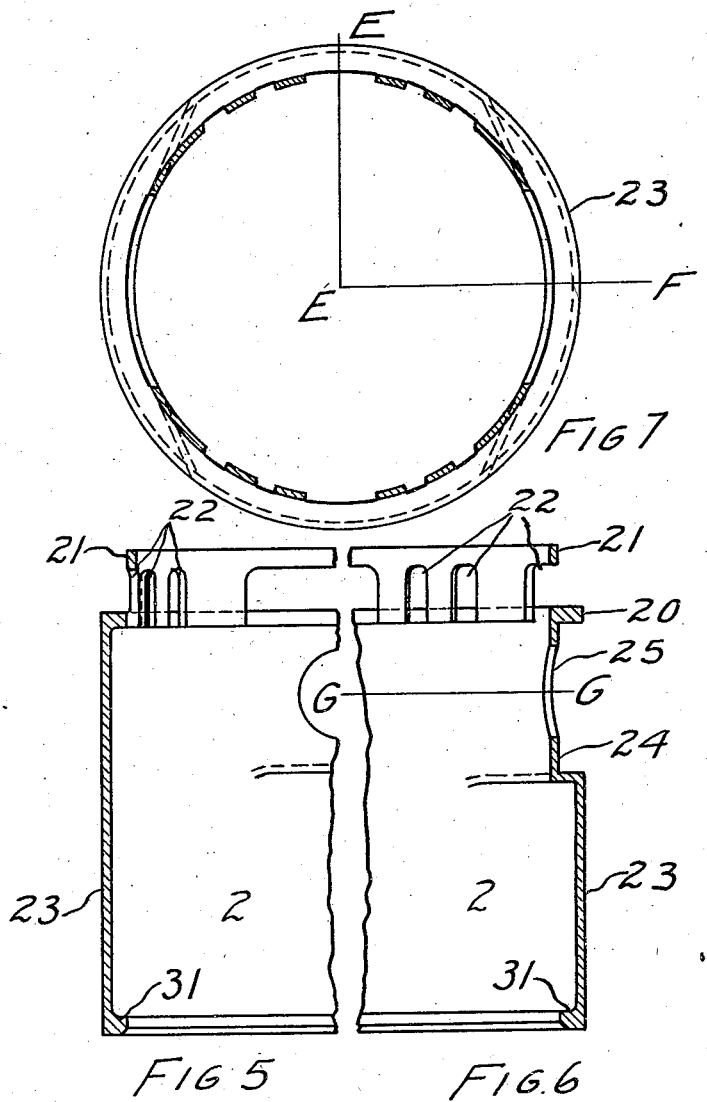

1,748,524

UNITED STATES PATENT OFFICE

HAROLD A. SOULIS, OF NEW YORK, N. Y., AND WILBUR T. SOULIS, OF EASTON, PENNSYLVANIA

INTERNAL-COMBUSTION-ENGINE PISTON

Application filed May 23, 1927. Serial No. 193,457.

The invention is an improvement in pistons for internal combustion engines and means for constructing the same whereby the efficiency of internal combustion engines in which my invention is embodied will be materially increased.

The principal duty of an internal combustion engine piston when used in an internal combustion engine is to receive the pressure due to the explosion or burning of fuel in the cylinder and impart this pressure or force to a connecting rod which will in turn convert, when attached to a crank pin, the power into useful work. However the tendency in modern engine design is toward high speed engines and the reciprocating parts, which includes the piston, must be light weight, or the secondary or inertia forces will be excessive and the pick-up or acceleration will be slow. The most widely used light weight pistons are of an aluminum alloy construction which is well enough for heat conductivity and light enough in weight, however, an aluminum alloy piston has excessive expansion and excessive wear on its skirt and also charges with foreign abrasive substances, which find their way into an engine, and when in sliding contact under pressure with the cylinder walls acts as a lap. The cast iron or bronze piston has a lower co-efficient of expansion and their surfaces are good bearings, their weights however are excessive and their heat conducting properties are not sufficient to keep the piston head cool when a high compression is used and would therefore not allow an internal combustion engine to function properly at high speeds. It is therefore seen that to produce a piston that will have the required properties, various metals must be permanently united and placed in the piston structure where their particular properties may be used to advantage.

A further object of our invention is to so construct an internal combustion engine piston of two unlike metals that they are joined in such a manner that will securely lock the two metals together to keep the joint between the two metals solid at all times and to set back the metal in the shell around the wrist pin boss to allow a simpler casting operation to be used when the head is cast on the skirt lock hole section. Also, the lock holes are of such a shape that the cores are easily made and set and the head metal will flow through to form rivet heads to hold in a close bond the two metals.

The object of our invention is to provide an internal combustion engine piston for use in an internal combustion engine, which will fulfil the exacting requirements hereinbefore specified, and this in a device which is simple in construction, reliable in operation, light in weight, low skirt expansion and with long life.

Other objects and advantages flowing from the utilization of our invention will doubtless present themselves as the description proceeds and we would have it clearly understood that we reserve unto ourselves all rights to the full range of equivalents, both in manner of practicing our method or process and its use, to which we may be entitled under our invention in its broadest aspect.

For a consideration of what we believe to be novel in our invention, attention is directed to the accompanying description and claims appended thereto.

We shall now proceed to describe our invention with reference to the accompanying drawings, wherein we have illustrated certain preferred embodiments for the purpose of presenting a clear and comprehensive disclosure, it being obvious that our invention is susceptible of taking other forms without departing from the scope and spirit thereof.

Fig. 1 is an elevation in section taken through A A of Fig. 3 showing the manner in which the head metal is locked into the skirt or shell section of the piston.

Fig. 2 is an elevation in section taken through A B of Fig. 4 showing the recess in the skirt member at the wrist pin boss.

Fig. 3 is a plan in section taken through D D of Fig. 1 showing the manner of allowing the head metal to flow through the shell opening to form wedges or rivets when cooled and contracted to securely clamp the skirt member to the head.

Fig. 4 is a plan in section taken through C C of Fig. 2 showing one method of setting back the skirt metal at the wrist pin bosses, to form a face which will be as close or closer to the vertical centerline of the piston than any other part of the skirt below the inside recess face.

Fig. 5 is an elevation in section through E E of Fig. 7 showing the lock holes and skirt in section at a point other than at the wrist pin boss recesses.

Fig. 6 is an elevation in section through E F of Fig. 7 showing the method of recessing the skirt at the wrist pin boss.

Fig. 7 is a plan in section through G G of Fig. 6 showing the locking holes in section and the wrist pin skirt recess.

Fig. 8 is an elevation in section through H H of Fig. 11 showing the lock holes and groove at the skirt shoulder.

Fig. 9 is an elevation in section through H K of Fig. 11 showing recess in the skirt at the wrist pin boss.

Fig. 10 is a plan in section through M M of Fig. 9.

Fig. 11 is an elevation in section through the wrist pin boss recess.

Referring now to the drawings in detail in which like characters of reference are employed to designate similar parts throughout the several views, 2 shown in Figs. 1, 2, 5, 6, 8, 9, 10 is a piston skirt consisting of a thin light cast iron or bronze skirt, with a shoulder 20, of heavy section to present the aluminum or aluminum alloy head from expanding due to the heat of combustion, it being cast integral with the shoulder or lock hole section 21 which has lock holes 22 cast or machined in its circumference and are of such a shape that they may be cast in the conventional way without the use of expensive cores or cores that would not be practical to handle in the ordinary foundry practice. Integral with the expansion ring 20 is the skirt 23 having wrist pin boss recesses 24 which are of such shape and size as to allow a single piece core of steel or sand to be placed in position for molding on the piston head. The wrist pin holes 25 are preferably drilled out after the piston head has been united with the skirt section and the piston finish machined. 26 shown in Figs. 9 and 10 shows an opening under the wrist pin boss recess to act as an oil wiper and to remove metal that there is no particular advantage in retaining.

It will be noticed that lock holes 22 are of such a shape that the head metal will run over and down at 27 to serve as an additional lock against head expansion. 28 illustrates how the head metal will flow through opening 22 and act, in cooling as a rivet having a clamping effect on the shoulder 21 preventing the two metal sections 21 and head section 28 from parting due to forces acting in any direction. Head section 28 has cast integral with it wrist pin bosses 29 supported by one or more ribs shown at 30. Skirt section 2 may have ledge 31 on the skirt bottom or may have no ledge as shown at 32. When no ledge is used the skirt wall 23 must be heavier than when there is a ledge used. In practice the skirt sections 2 is placed in a mold after first inserting a core into the skirt, after which molten metal is poured into a mold gate and the molten metal will run through and around the lock holes 22 shown in Figs. 8 and 9 and 10, and flow into lock recess 33 taking the shape of the mold and core to form an internal combustion engine piston head of lighter material than the skirt section.

34 shows an oil scraper groove cut above the iron skirt section, 35 shows holes which are used for draining the excessive oil from groove 34, 36 shows a hole used to drain some of the excessive oil from the groove 34 to the wrist pin for oiling.

It is seen that in some instances it may be desirable to modify the number or shape of the locking holes and that the wrist pin boss recess may be modified to meet a different condition of construction.

We claim:

1. A light weight bi-metallic piston for internal combustion engines embodying a cylindrical shell of thin wall cast iron open at each end, diametrically opposed portions of said wall being inset to form flat surfaces apertured to receive a wrist pin, the upper end of the wall of said shell being shouldered, the wall of said shell above said shoulder being formed with a series of elongated openings through the wall and down into the shoulder, and a head composed of an aluminum alloy cast upon said shell, said head having wrist pin bosses formed integral therewith coinciding with said apertures in the shell and embracing said flat inset portions of the shell and that portion of the shell above said shoulder, and extending through the elongated openings to form an interlocking engagement of the shell and head metal.

2. A light weight composite piston for internal combustion engines composed of a tubular cast iron shell of thin wall section, apertured at diametrically opposite points in said wall to receive a wrist pin, the upper end of said wall being of reduced diameter with a heavy shoulder section integrally connecting the body of said shell therewith and formed with a series of elongated circumferential openings through the wall and downwardly into said shoulder, and a head of an aluminum alloy having integral wrist pin bosses coinciding with said apertures, the head metal extending through said circumferential openings and entirely embracing said reduced portion, the portions of said shell and head metal adjacent the apertures being inset to facilitate casting in the process of making, as described.

3. A cylindrical shell for a bi-metallic piston of cast iron having a thin wall section, and formed with a portion of reduced diameter at its upper end, providing a relatively thick circumferential shoulder, said reduced portion being provided with elongated apertures extending into said shoulder, the wall of the portion of the shell of major diameter being flat in two diametrically opposite zones extending from a point beneath said shoulder to a line spaced upwardly from the base of said shell, said flattened surfaces being apertured to receive a wrist pin disposed transversely of said shell.

4. A cylindrical shell for a bi-metallic piston of cast iron having a thin wall section, and formed with a portion of reduced diameter at its upper end of uniform wall section, providing a relatively thick circumferential shoulder, and an inwardly directed flange at its lower end, said reduced portion being provided with elongated apertures extending into said shoulder, the wall of the portion of the shell of major diameter being flat in two diametrically opposite zones extending from a point beneath said shoulder to a line spaced upwardly from the base of said shell, said flattened surfaces being apertured to receive a wrist pin disposed transversely of said shell.

WILBUR T. SOULIS.
HAROLD A. SOULIS.